Nov. 23, 1926.  
J. H. PEPER  
1,607,912  
HYDROMETER  
Filed Jan. 22. 1924
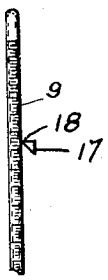
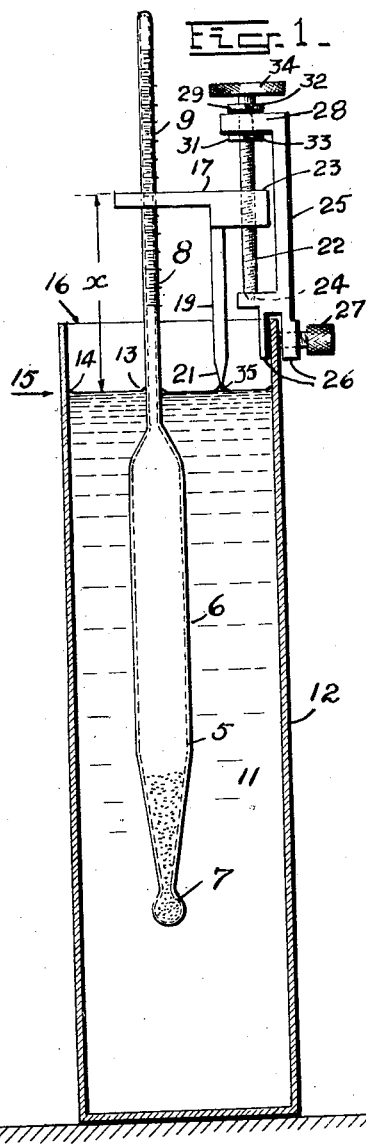
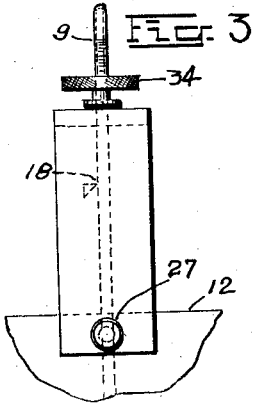
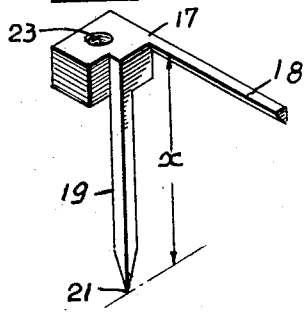
INVENTOR  
JOHN H. PEPER  
BY  
Regis, Price & Reynolds  
ATTORNEYS Patented Nov. 23, 1926.

1,607,912

UNITED STATES PATENT OFFICE.

JOHN HENRY PEPER, OF BROOKLYN, NEW YORK, ASSIGNOR TO INDIANA PIPE LINE COMPANY, OF HUNTINGTON, INDIANA, A CORPORATION OF INDIANA.

HYDROMETER.

Application filed January 22, 1924. Serial No. 687,698.

This invention relates to hydrometers and more particularly to such instruments especially adapted for measuring the specific gravity of crude oil and other dark colored liquids which wet glass.

An object of my invention is to facilitate the accurate reading of hydrometers.

Another object of my invention is to provide for the reading of the scale on a hydrometer at a convenient distance from the surface of the liquid whose specific gravity is being measured.

A further object of my invention is to eliminate inaccuracies in reading hydrometers due to the formation of a meniscus at the surface of the liquid in which the hydrometer is immersed, where the stem of the hydrometer emerges therefrom.

A still further object of my invention is to provide an indicator adapted to be accurately positioned a definite distance above the surface of the liquid, whose specific gravity is to be determined, and so position the scale on the hydrometer that it is raised such a distance above normal so that readings are taken thereon when positioned adjacent the indicator.

Other objects and advantages of the invention will become apparent as the description proceeds.

In measuring the specific gravity of crude oil and other dark-colored liquids which wet glass, considerable difficulty has been experienced in accurately reading the scale on the stem of a hydrometer floating therein. This difficulty results from the fact that a meniscus, concave if the liquid wets the stem of the hydrometer, is formed where the stem with the scale thereon emerges from the liquid. In order to read the scale accurately it should be read through the meniscus, if the liquid wets the glass, and an accurate reading is practically impossible if the liquid is dark-colored, like crude oil and the like. Even if the liquid is light-colored and transparent, there is some inaccuracy in reading through a meniscus, because of the refraction of the light therethrough.

To remedy this difficulty, I have invented a hydrometer in which the scale is adapted to be read at a definite distance above the surface of the liquid in which it is immersed. The scale of the hydrometer is then preferably read at a horizontal indicator rigidly held at a corresponding distance above the surface of the liquid. The indicator is preferably provided with a knife edge, against which an accurate reading of the scale on the hydrometer is adapted to be taken, at the same time permitting the hydrometer to move up and down with practically no friction.

The indicator is preferably provided with a pointed gage, rigid or integral therewith and extending downwardly therefrom when normally positioned. When so positioned, the knife edge is a distance above the pointed end of the gage, equal to the distance the scale on the hydrometer stem is raised above normal. Means are preferably provided for accurately positioning the knife edge on the indicator at the desired distance above the surface of the liquid by slowly moving it towards the liquid until the pointed end of the gage just makes contact with the liquid. By reason of the use of a pointed gage, it is possible to tell instantly when the gage has been brought into contact with the surface of the liquid, as there is a visible agitation which occurs at the time the contact is made, resulting from the surface tension of the liquid. The scale on the hydrometer is then read, where it registers with the knife edge.

My invention will better be understood by referring to the accompanying drawing in which, Fig. 1 is an elevation of my hydrometer and indicator, a tank containing the liquid in which the hydrometer is immersed and on which the indicator is supported, being shown in vertical section.

Fig. 2 is a partial side elevation of the hydrometer and indicator as shown in Fig. 1, showing the position of the knife edge with respect to the hydrometer scale when a reading is taken.

Fig. 3 is a partial side elevation of the device, showing particularly the supporting guide for holding the indicator in position, and Fig. 4 is a perspective view of the indicator.

My hydrometer 5, as shown in Fig. 1, may be of conventional construction, except for the scale thereon, and comprises a hollow glass tube 6, weighted at 7, and provided with a stem 8 of restricted diameter. On the stem 8 a scale of the desired graduations 9 is provided and displaced or raised above normal a convenient distance X. The hydrometer, when in use, is immersed in a liquid 11 held in a vessel 12. If the liquid 11 wets the glass stem 8 of the hydrometer, a concave meniscus 13, where the stem emerges therefrom, is formed as shown. If the liquid does not wet the glass-stem, for example, if the stem is greasy and the hydrometer is immersed in an aqueous liquid, a convex meniscus would be formed, as will be understood. A concave meniscus 14 would also probably be formed between the liquid 11 and the walls of the vessel 12.

In reading an hydrometer of usual construction in such a liquid, an observer should look along the plane of the surface of the liquid, for example, in the direction of the arrow 15, and his line of vision would be interfered with by the wall of the vessel 12, which might be of glass not too clean, and by the two menisci 14 and 13. Even if the liquid is clear, the accuracy of the reading on the hydrometer scale will be interfered with by the refractive action of one or both of the menisci. Of course it is appreciated that an observer would probably look at an angle to the plane of the surface of the liquid, for example, in the general direction of the arrow 16, in which case, although there would only be one meniscus to interfere with reading the scale on the hydrometer, errors would be introduced into the reading because of the fact that the scale should be read at the surface of the liquid and not at the upper edge of the meniscus 13. This edge would be too high for a concave meniscus and too low for a convex one. If an observer attempted to judge where the reading should be taken through the meniscus, his judgment would be affected by the refractive action of the liquid meniscus, if clear, and also by the obscuring effect of the meniscus, if the liquid is cloudy or dark-colored.

According to my invention, I raise or elevate the scale a convenient distance X, so that the reading should be taken at that distance above the surface of the liquid, and furnish an indicator or pointer 17, preferably provided with a knife edge 18, adapted to be accurately positioned at the distance X above the surface of the liquid 11 and close to, or touching, the scale 9 of the hydrometer 5. In this way an observer can accurately read the scale by sighting horizontally along the upper edge of the indicator, held horizontal as shown, to where the knife edge 18 registers with the scale 9. In this way the scale may be read as accurately as a slide rule, vernier or the like.

In order to accurately position the indicator knife edge at the required distance X above the surface of the liquid 11, the same is preferably provided with a downwardly extending gage 19, provided with a pointed end 21 so positioned that when this end just engages with the surface of the liquid 11, the knife edge 18 is positioned at the required distance X above the surface of the liquid, for reading the scale thereagainst. Any suitable means may be provided for accurately positioning the knife edge, the embodiment shown comprising an adjusting screw 22 preferably formed with fine thread and accurately engaging with a corresponding apertured threaded portion 23 of the indicator, as shown. The screw at its lower end may be tapered and rest in a similar bearing 24, as part of a supporting guide 25. The guide 25 is preferably provided with a bifurcated lower end 26, engaging the upper edge of the vessel 12 and clamped thereto by means of a set screw 27, as shown. For use with a glass vessel, the set screw 27 is preferably made of hard rubber or fibre. The upper end of the supporting guide is provided with a bearing 28 holding a smooth, upper portion of the adjusting screw 22. The screw 22 is preferably held in position by means of collars 29 and 31, held thereto as shown by pins 32 and 33, thus preventing motion of the screw 22 up or down. For turning the set screw a knurled head 34 may be provided.

A preferred manner of using my device is to clamp the supporting guide 25 on the edge of a jar or vessel 12, of such size that the indicator 17 extends beyond the center thereof. Sufficient liquid 11 may then be placed in the vessel to float the hydrometer 5 therein, with the surface thereof a short distance below the point 21 of the gage 19.

The hydrometer 5 is then placed in the liquid 11, near the center of the vessel 12, and adjacent to, or touching, the knife edge 18. The knife edge 18 is then slowly lowered by turning the knurled head 34 of the adjusting screw, until the point 21 just engages with the surface of the liquid. This is readily noticeable as a meniscus 35 immediately forms at that point, as shown, causing a slight agitation of the surface of the liquid. The scale 9 on the hydrometer may then be accurately read by sighting horizontally along the upper surface of the indicator 17, to where the knife edge registers with the scale.

If desirable, the hydrometer may be provided with a temperature or thermometer scale in the stem thereof on the opposite side from that on which the gravity scale is marked, thus permitting temperature and gravity readings to be taken at substantially the same time. Such construction will be obvious to those skilled in the art.

Although I have described what is now considered a preferred embodiment of my invention, it is obvious that I do not wish to be restricted to the exact details thereof, as modifications may occur to those skilled in the art, within the spirit and scope of the appended claims defining my invention.

What I claim is:—

1. In combination, a hydrometer provided with a scale for indicating the specific gravity of liquids, said scale being positioned so as to directly show the specific gravity, when read at a distance above the surface of a liquid in which the hydrometer floats, an indicator, a gage rigidly connected to the indicator and normally extending downwardly, the lower end of the gage being a distance below the indicator corresponding to that at which the scale is to be read above the surface of the liquid, a supporting device for the indicator, a threaded apertured portion on the indicator and a screw engaging said threaded portion and rotatable in said supporting device, whereby said indicator may be accurately positioned at the proper level, for reading the hydrometer scale thereagainst, above the surface of the liquid by a movement of the screw.

2. Apparatus for determining the specific gravity of a liquid comprising a vessel containing the liquid, a hydrometer provided with a scale for indicating the specific gravity of the liquid, the scale being located so as to be correctly read at a distance above the surface of the liquid, to eliminate error in reading at the surface caused by the meniscus formed where the hydrometer emerges from the liquid, an indicator provided with an edge for reading the scale thereagainst and a threaded apertured portion, a screw engaging the threaded portion, and a support in which said screw is adapted to be turned to accurately position the edge the required distance above the surface of the liquid for reading the scale.

3. Apparatus for determining the specific gravity of a liquid comprising a vessel containing the liquid, a hydrometer provided with a scale for indicating the specific gravity of the liquid, the scale being positioned so as to be correctly read at a distance above the surface of the liquid, to eliminate error in reading at the surface caused by the meniscus formed where the hydrometer emerges from the liquid, an indicator provided with a knife edge and a threaded apertured portion, a pointed gage extending downwardly from the indicator to aid in properly positioning the indicator, an adjusting screw engaging the threaded portion, and a support, in which said screw is turned, means clamping said support to the containing vessel, said screw serving to accurately move the knife edge to the required position above the surface of the liquid for reading the scale, the gage showing when the knife edge is properly positioned by just engaging the surface of the liquid and forming a meniscus.

4. Apparatus for determining the specific gravity of a liquid comprising a vessel containing the liquid, a hydrometer floating in the liquid and provided with a scale for indicating the specific gravity of the liquid, said scale being positioned so as to directly show the proper specific gravity, when read at a distance above the surface of the liquid, to eliminate error in reading at the surface caused by the meniscus formed where the surface of the liquid engages the hydrometer, an indicator provided with a knife edge, a pointed gage rigidly connected to the knife edge and extending downwardly, the point of the gage being a distance below the knife edge corresponding to that at which the scale is to be read above the surface of the liquid, a threaded apertured portion in an extension of the knife edge and an adjusting screw engaging said threaded portion, a supporting guide in which the screw is movably mounted, means for rigidly attaching the guide to the containing vessel, whereby the knife edge may be accurately positioned at the proper level above the surface of the liquid by an adjustment of the screw, for accurately reading the scale on the hydrometer, said proper adjustment being shown when the point of the gage just meets the surface of the liquid and forms a meniscus.

5. A hydrometer provided with a scale intended to be read at a distance above the surface of a liquid in which the hydrometer floats, an indicator for showing the reading on the scale, a gage connected to the indicator and positioned so that the lower end thereof is a distance below the indicator corresponding to that at which the scale is intended to be read above the surface of the liquid, a support for the indicator, a threaded apertured portion on the indicator and an adjusting screw engaging said threaded portion and rotatable in said support, whereby said indicator may be accurately positioned for reading the hydrometer scale thereagainst above the surface of the liquid.

In testimony whereof, I have hereunto subscribed my name this 18th day of January, 1924.

JOHN HENRY PEPER.